United States Patent [19]

Lenhardt

[11] Patent Number: 4,911,779
[45] Date of Patent: Mar. 27, 1990

[54] APPARATUS FOR A SLIPLESS CONVEYANCE OF TWO PLATES

[75] Inventor: Karl Lenhardt, Neuhausen-Hamberg, Fed. Rep. of Germany

[73] Assignee: Lenhardt Maschinenbau GmbH, Neuhausen-Hamberg, Fed. Rep. of Germany

[21] Appl. No.: 925,269

[22] Filed: Oct. 31, 1986

[30] Foreign Application Priority Data

Nov. 11, 1985 [DE] Fed. Rep. of Germany ....... 3539879

[51] Int. Cl.⁴ ............................................. B65G 13/02
[52] U.S. Cl. ................................... 156/556; 198/626; 198/627; 198/689.1; 156/107; 156/109; 271/197; 271/276
[58] Field of Search ................. 156/556, 107, 109, 99; 264/46.5, 46.2; 198/689.1, 626; 271/197, 276

[56] References Cited

U.S. PATENT DOCUMENTS

| | | | |
|---|---|---|---|
| 3,167,603 | 1/1965 | Lillie | 264/46.2 |
| 3,701,412 | 10/1972 | Wriedt | 271/197 X |
| 4,434,024 | 2/1984 | Lisec | 156/99 X |
| 4,561,929 | 12/1985 | Lenhardt | 156/99 X |
| 4,680,000 | 7/1987 | Nowicki et al. | 198/689.1 X |

FOREIGN PATENT DOCUMENTS 2816437 4/1978 Fed. Rep. of Germany ........ 156/99

Primary Examiner—David Simmons
Attorney, Agent, or Firm—Balogh, Osann, Kramer, Dvorak, Genova & Traub

[57] ABSTRACT

The apparatus serves for a slipless conveyance of two coextensive parallel plates, which are in register and transversely spaced apart and supported on those broadsides which are remote from each other in respective planes of travel. The apparatus comprises at least two vacuum-applying conveyors, which are adapted to be driven in synchronism in a direction of travel and extend parallel to each other and are disposed opposite to each other and transversely spaced apart and are adapted to contact said plates on those broadsides which are remote from each other and to convey said plates in said direction of travel.

13 Claims, 9 Drawing Sheets

Fig. 6  Section VI-VI

APPARATUS FOR A SLIPLESS CONVEYANCE OF TWO PLATES

BACKGROUND OF THE INVENTION

1. Field of the Invention

This invention relates to apparatus for a slipless conveyance of two plates, particularly of glass plates, which are coextensive and in register and parallel to each other and transversely spaced apart and are supported at those broadsides which are remote from each other and define respective planes of travel, which may be inclined, vertical or approximately vertical, or horizontal.

2. Description of the Prior Art

Such an apparatus has been described in DE 30 38 425 C2. By that known apparatus, glass panes which are provided with adhesive joints at their edges are conveyed in an approximately vertical orientation. The insulating glass pane provided with adhesive edge joints consists of two glass plates, which are interconnected by a spacer frame, which is coated with adhesive on both sides. The bars of the spacer frames are slightly shorter than the associated edges of the glass plates so that the two glass plates define between them on the outside of the spacer frame an edge groove, which is filled with a sealing compound to prevent an ingress of moisture into the interior of the insulating glass pane.

The apparatus known from DE 30 38 425 C2 comprises a bottom edge-supporting conveyor having supports which contact the bottom edge of the glass plates while leaving the bottom edge groove free and which are synchronously moved in the direction of travel of the apparatus so that said supports convey the insulating glass pane. The insulating glass pane is laterally supported by backing rollers, which are arranged in a row and contact the rear glass plate of the insulating glass pane. The forward glass plate of each pane is supported by means of the spacer frame on the rear glass plate. To prevent a slip of the insulating glass panes being conveyed and to prevent also a slipping of the insulating glass pane from the supports, which laterally project only slightly under the pane, the supports are L-shaped and their horizontal arms contact the bottom edges of the glass plates whereas the rising arms constitute jaws which apply pressure to the outside surfaces of the two glass plates.

The apparatus which is known from DE 30 38 425 C2 has the disadvantage that the impact of the bottom edge-supporting conveyor on the bottom edge of the glass plates sometimes results in a splintering or fracture of glass. Another disadvantage of the known apparatus resides in that it cannot be used to convey pairs of transversely spaced apart, parallel glass plates which are in register but have not yet been joined to each other. An apparatus which can be used for that purpose has been described in DE 28 20 630 A1. The apparatus known from that printed publication comprises a horizontally conveying bottom edge-supporting conveyor, which consists of synchronously driven rollers, which are arranged in pairs mounted on respective axles and coupled by a friction coupling. The apparatus also comprises an array of backing rollers for supporting one glass plate on one broadside. The backing rollers of said array are tangent to a common plane. Above the bottom edge-supporting conveyor the apparatus comprises a beam, which is parallel to said conveyor and is adjustable in height and carries additional backing rollers, which are arranged in a row in front of the tangenital plane of the backing roller array and are also tangent to a common plane, which is spaced a corresponding distance from the tangential plane of the backing roller array. Besides, the known apparatus is mounted to be reciprocable parallel to itself so that the apparatus can be reciprocated between positions in which the parallel tangential planes of the backing roller array and of the row of backing rollers coincide with the plane of travel of single consecutive glass plates conveyed by a preceding horizontal conveyor. The leading glass plate of a pair is caused to enter the apparatus when the tangential plane of the row of backing rollers coincides with the plane of travel of the glass plates on the preceding horizontal conveyor. The second glass plate of a pair is caused to enter the apparatus when the tangential plane of the backing roller array coincides with the plane of travel of the plates on the preceding horizontal conveyor. As a result, the glass plates can be arranged in the apparatus to form pairs of transversely spaced apart glass plates which are coextensive and in register and can be synchronously conveyed further without being joined. But the known apparatus has the disadvantage that the initially leading glass plate of each pair may laterally slip at its bottom edge, that a slipless conveyance is not ensured because the coupling between the glass plates and the rollers of the bottom edge-supporting conveyor will depend on the weight of the glass plates, and that the backing rollers of one row which are used to support the initially leading glass plate of each pair extend into the space between the glass plates to that the gap at the top edges of the two glass plates is not entirely exposed. Another disadvantage of the known apparatus resides in that it can be used to convey glass plates only when they have an almost vertical orientation rather than a strongly inclined or even horizontal orientation.

SUMMARY OF THE INVENTION

It is an object of the invention to provide an apparatus which is of the kind described first hereinbefore and can be used for a slipless conveyance of pairs of joined or unconnected plates in approximately vertical and other position without a need for supporting or conveying elements extending into the space between the two glass plates of a pair thereof.

That object is accomplished by such an apparatus which comprises at least two vacuum-applying conveyors, which define said planes of travel and are adapted to be driven in synchronism to move parallel to each other and are spaced apart transversely to said planes of travel and adapted to sliplessly contact and to apply a vacuum to the plates on said broadsides which are remote from each other and to convey said glass plates along said planes of travel.

Desirable additional features are recited in the dependent claims.

The vacuum-applying conveyors which are provided in accordance with the invention contact the two plates of each pair on those broadsides which are remote from each other and apply a vacuum to each of the two plates independently of the other. As a result, a slip between the vacuum-applying conveyors and the plates in contact therewith will be prevented when the vacuum-applying conveyors convey the two plates along parallel paths.

Each of the vacuum-applying conveyors defines a plane of contact, which coincides with that broadside on which the adjacent plate is contacted by the vacuum-applying conveyor. Said planes of contact, which are determined by the positions of the vacuum-applying conveyors in the apparatus, will be described hereinafter as the planes of travel for the two plates of each pair.

The vacuum-applying conveyors act only on the outer broadsides of the plates. A special advantage afforded by the invention resides in that the vacuum-applying conveyors do not contact the edge faces of the plates and do not extend into the space between the two plates of a pair. For this reason the plates which are in contact with the vacuum-applying conveyors can be processed at their edges or tools may be moved into the space between the two plates of each pair while the plates are in contact with the vacuum-applying conveyors, which may be moved or may be at rest at that time. For instance, an extrusion consisting of an initially pastelike and subsequently hardening composition may be discharged into the space between two initially unconnected glass plates so that the glass plates can be joined and sealed in one operation. When such operation is performed in the manufacture of insulating glass, the two glass plates to be joined should not be urged toward each other during the discharge of the pastelike composition and for a sufficient time after said discharge because the composition cannot take up substantial pressure forces until it has sufficiently hardened. That requirement can readily be met by the apparatus in accordance with the invention because the vacuum-applying conveyors retain the glass plates by exerting a suction force rather than a pressure force on said plates. The plates can be properly spaced apart by means of two vacuum-applying conveyors which are opposite to each other and are spaced an adjustable distance from each other. For instance, an individual glass plate can be conveyed in contact with a first vacuum-aplying conveyor, which is arrested when the glass plate is in a predetermined position, whereafter the opposite second vacuum-applying conveyor is moved into contact with that glass plate and operated to suck and take over that glass plate and is then moved to a position in which said glass plate is clear of the first mentioned vacuum-applying conveyor, whereafter said second vacuum-applying conveyor is held at rest and a second glass plate having the same size as the first is conveyed by the first vacuum-applying conveyor until the second glass plate is also in the predetermined position in register with the first glass plate. The thus positioned glass plates can then be conveyed with a predetermined transverse spacing in synchronism with each other in that the two vacuum-applying conveyors are synchronously driven. Adjusting means for changing the distance between the two mutually opposite vacuum-applying conveyors are known to those skilled in the art. The means for changing the spacing of two mutually opposite vacuum-applying conveyors may be used to apply a certain pressure to an extrusion, spacer, tool or the like which is disposed between two plates, if this is desired for other reasons. But the application of such pressure is no necessity but constitutes only an option which increases the field of application of the apparatus in accordance with the invention.

If an extrusion consisting of an initially pastelike composition is discharged between two glass plates in the manner described hereinbefore, the apparatus in accordance with the invention will afford the additional advantage that such extrusion will nowhere be acted upon by a supporting or conveying element which might deform or damage such extrusion. Owing to that advantage, apparatuses in accordance with the invention are eminently suitable for conveying insulating glass panes made of glass plates which are initially joined to a spacer frame that has been coated with adhesive on both sides and which are subsequently sealed by means of a sealing compound.

In both cases the invention affords the additional advantage that the conveying elements do not contact the edge faces of the glass plates so that a splintering or fracture of the glass being conveyed will be virtually precluded.

A further advantage afforded by the invention resides in that the vacuum-applying conveyors may have virtually any orientation so that the apparatus can be designed to convey plates in any desired orientation, not only in a vertical or approximately vertical orientation but also in a substantially inclined or even in a horizontal orientation. In the preferred use of the apparatus, glass plates are conveyed in an approximately vertical orientation. It will be understood that the claimed conveying operation is applicable not only to the conveyance of glass plates but can also be applied to the conveyance of different plates, provided that they have a surface which can properly be acted upon by vacuum-applying conveyors, such as plates of wood, plastic or sheet metal.

In dependence on the size of the plates to be conveyed it may be desirable to provide on each side of the apparatus a plurality of vacuum-applying conveyors in a row extending in the direction of travel of the apparatus and/or to provide on at least one side of the apparatus two or more, preferably three vacuum-applying conveyors which are juxtaposed transversely to the direction of travel and define a common plane of travel so that they can act on one and the same plate at the same time. The spacing of said juxtaposed vacuum-applying conveyors can preferably be varied so that the positions of the vacuum-applying conveyors can be adjusted in dependence on changing plate sizes. That spacing is preferably selected so that the forces by which said vacuum-applying conveyors support and hold each plate will be distributed over the plate as uniformly as possible so that the required suction power will be minimized. If more than two juxtaposed vacuum-applying conveyors are provided on one side of the apparatus, the spacing of said conveyors can preferably be adjusted in such a manner that the ratio of the distance by which the conveyors are spaced apart will not be changed. If three juxtaposed vacuum-applying conveyors are spaced equal distances apart, this means that the intermediate vacuum-applying conveyor will be displaced by one half of the displacement of one of the adjacent vacuum-applying conveyors whereas the position of the third vacuum-applying conveyor will not be changed.

If the plates to be conveyed have transversely to the direction of travel of the apparatus a dimension greatly in excess of the corresponding extent of the vacuum-applying conveyor or conveyors, it may be desirable to support such large plate on one broadside by additional backing means, which do not consist of a vacuum-applying conveyor and define a backing plane which coincides with the plane of travel defined by the adjacent vacuum-applying conveyor or conveyors. Such additional backing means may consist of an array of backing rollers or a backing wall, particularly an air cushion wall, which will permit a conveyance with a low friction. The use of such additional backing means will afford the advantage that it involves a lower expenditure than a corresponding additional vacuum-applying conveyor. It will be understood that backing means cannot be used in addition to a vacuum-applying conveyor unless the existing vacuum-applying conveyor or conveyors is or are designed to be capable of retaining and slipessly conveying the plates to be handled.

If the additional backing means comprise an air cushion wall, the same may desirably be functionally connected to the vacuum-applying conveyor or conveyors in that both are operated by means of the same fan, which communicates on its discharge side with the air cushion wall and on its suction side with the vacuum-applying conveyor or conveyors. Such an arrangement will improve the economy of the apparatus in operation.

The vacuum-applying conveyors might consist of individual vacuum cups or vacuum plates which are mounted on a frame member of the apparatus and are positively guided by said frame member for a movement in the direction of travel of the apparatus. Such vacuum-applying conveyors have been disclosed in DE 28 46 785 C2 and in accordance with that disclosure are provided only on one side of the plane of travel of an insulating glass pane so that they contact such pane only on one side rather than on both sides.

Particularly when used to convey plates which differ in size and/or are spaced different distances apart, the apparatus will involve a lower expenditure and will be more versatile if it comprises vacuum-applying conveyors each of which comprises a vacuum channel, which is open toward the associated plane of travel and provided on the forward side of an elongate beam, which is formed with at least one vacuum port that is connected to a vacuum source, and said vacuum-applying conveyor also comprises two parallel endless belts, which have forward surfaces extending substantially in the plane of travel and are adapted to be synchronously driven in the same direction. Such vacuum-applying conveyor has been specifically described in co-pending U.S. patent application Ser. No. 768,020, filed Aug. 21, 1985, for "DEVICES FOR NON-SLIP CONVEYING OF FLAT PANELS IN ANY POSITION", which is no prior publication. It is conveniently operable like an endless belt conveyor and affords the additional advantage that the vacuum established in the vacuum channel when it is covered by a plate will prevent a slip between the plates and the endless belts disposed on opposite sides of the vacuum channel. A requirement which is of great significance for the use of such vacuum-applying conveyor resides in that the belt friction which is due to the vacuum action should not be excessive so that also the power required to drive the belts will not be excessive. That problem will particularly arise when the plates to be conveyed are large and heavy. In that case it will be recommendable to use a vacuum-applying conveyor in which the working course of each belt—i.e., that course which contacts the plates to be conveyed—is not pulled in contact with a stationary surface by which the suction force is taken up but is moved in rolling contact with rollers, particularly with freely rotatable rollers, which are closely spaced apart in a row. In that case even the conveyance of large and heavy glass plates will require only a moderate force. Such a vacuum-applying conveyor in which the working course of each belt is in rolling contact with rollers has been described in detail in co-pending U.S. patent application Ser. No. 925,615, filed Oct. 31, 1986, for "APPARATUS FOR A SLIPLESS CONVEYANCE OF DISCRETE ARTICLES". The contents of that patent application is incorporated herein by reference.

If the apparatus in accordance with the invention is designed to convey plates in a non-horizontal orientation, i.e., in an inclined or vertical or substantially vertical orientation, it may be desirable to provide below the vacuum-applying conveyors a bottom edge-supporting conveyor, which is adapted to be driven in synchronism with the vacuum-applying conveyors and comprises supports, which are adapted to support the plates at their bottom edges and preferably extend from one plane of travel to the other. Such additional bottom edge-supporting conveyor may be provided if the bottom edge of the plates been conveyed need not be kept free from conveying elements. The provision of the additional bottom edge-supporting conveyor will afford the advantage that it can relieve the vacuum-applying conveyors by contributing to the supporting and conveying of the plates. Specifically, the number in which vacuum-applying conveyors would otherwise be required or their size and suction capacity can be reduced if such bottom edge-supporting conveyor is employed. Where such additional bottom edge-supporting conveyor is provided, is is preferably adapted to be lowered so that it can be disengaged from the bottom edges of the plates in case of need. The bottom edge-supporting conveyor may consist of an endless conveyor belt, which may be supported in conventional manner. But it is preferable to provide a plurality of rollers, which are arranged in a row and adapted to be driven in synchronism and which on their circumferential surfaces support the plates at their bottom edges.

The additional bottom edge-supporting conveyor will also prevent the plates from falling from the vacuum-applying conveyors when a malfunction has resulted in a sudden decrease of the suction force. In apparatus comprising no additional bottom edge-supporting conveyor it will be recommendable to provide the apparatus below the lower vacuum-applying conveyors at a certain distance from the predetermined path of the bottom edges of the plates with intercepting elements, which have a safety function and may consist, e.g., of pins extending transversely to the direction of travel from one plane of travel to the other.

It has been mentioned hereinbefore that the apparatus in accordance with the invention is particularly suitable for a conveyance of sealed insulating glass panes and for a conveyance of pairs of glass plates which are joined to form an insulating glass pane in that an extrusion consisting of an initially pastelike and subsequently hardening composition is discharged between the plates. The nozzles for injecting such pastelike extrusion into the space between two glass plates or for sealing two glass plates which have previously been adhesively joined by means of a spacer frame can easily be integrated in an apparatus in accordance with the invention. For this purpose it is preferable to provide at least one nozzle between two sections of the apparatus which succeed each other in the direction of travel and each of which comprises at least two mutually opposite vacuum-applying conveyors, which cooperate as is called for by the invention. In that case said nozzle or at least one of said nozzles is movable in a direction which is transverse to the direction of travel of the vacuum-applying conveyors and parallel to the two planes of travel, and the exit orifice or orifices of said one or more nozzles is or are disposed between the two planes of travel. The vacuum-applying conveyors provided in the first section of the apparatus will then deliver the glass plates to the nozzle or nozzles, from which the glass plates will be removed by the vacuum-applying conveyors provided in the second section of the apparatus. The path along which at least one nozzle is movable transversely to the direction of travel of the glass plates is disposed between the two sections, which are spaced only a small distance apart, which can be bridged without difficulty and without a slip by the glass plates being conveyed. Because the nozzle which is operated in that space between the sections does not occupy a large space, a sufficiently small distance may be left between the two sections of the apparatus.

On principle, four separate nozzles might be used for sealing a pair of glass plates at their four edges. But it is preferred to use only one nozzle, which in the claimed manner is movable transversely to the direction of travel of the glass plates and is rotatable in consecutive steps of 90°, or to use two nozzles, one of which is displaceable in the claimed manner transversely to the direction of travel of the glass plates and is rotatable in consecutive steps of 90° whereas the other nozzle is disposed on the level of the path of travel of the bottom edges of the pair of glass plates and serves only to discharge an extrusion along said bottom edge of the pair of glass plates. If one nozzle is or two nozzles are employed as described, it will be preferred to hold the glass plates of a given pair in position while those edges of said pair are sealed which extend transversely to the direction of travel of the glass plates, and to hold the nozzle or nozzles in position during the sealing of the pair of glass plates at those edges which are parallel to the direction of travel of the glass plates.

Additional arrangements and sequences of motion which may be adopted for the nozzles, inclusive of sequences in which one nozzle is movable in or opposite to the direction of travel of the glass plates to seal arrested pairs of glass plates at those edges which are parallel to the direction of travel, have been described in DE 28 16 437 C2 and DE 28 46 785 C2. Specifically, two nozzles may be provided, which are movable parallel to the planes of travel along two parallel paths which are oblique to the direction of travel, and said nozzles may be pivoted on an axis which is at right angles to the planes of travel. Such an arrangement is shown as the second embodiment disclosed in DE 28 16 437 C2 and affords the advantage that both nozzles can begin their operation simultaneously or approximately simultaneously at a first common corner and can terminate their operation simultaneously or approximately simultaneously at the opposite corner. As a result, the two extrusions discharged by said nozzles will be joined at the two corners when said extrusions are still soft (hot) so that a tight joint can readily be formed between the two extrusions.

In an apparatus in which only one nozzle is provided to seal an insulating glass pane consisting of two glass plates, it is preferable to provide three sections, which succeed each other in the direction of travel of the glass plates and each of which comprises at least two mutually opposite vacuum-applying conveyors which cooperate in the manner taught by the invention, and to provide said one nozzle between the first and second sections, which in addition to the vacuum-applying conveyors comprise each a bottom edge-supporting conveyor comprising supports for engaging the bottom edges of the glass plates, and to provide the bottom edge-supporting conveyor in the second section of the apparatus with supports which are adapted to be lowered. In that embodiment of the invention, no bottom edge-supporting conveyor may be provided in the third section of the apparatus or said third section may be provided with a bottom edge-supporting conveyor which has lowerable supports. As a result, the glass plates can be conveyed in said third section without being contacted at their bottom edge. The sequence of operations in such apparatus will be described more in detail with reference to the accompanying drawings so that additional explanations are not required here.

An apparatus which is in accordance with the invention and comprises two nozzles for sealing an insulating glass pane comprising two glass plates may consist of only two sections, each of which comprises at least two vacuum-applying conveyors which are disposed on opposite sides of the apparatus and cooperate in accordance with the invention. In such apparatus at least one nozzle, which is movable transversely to the direction of travel of the glass plates, but preferably also the second nozzle, which is movable only to the lower edges of the glass plates, is disposed between the two sections of the apparatus. In that case it will be preferable to provide the first section of the apparatus with a bottom edge-supporting conveyor comprising supports for engaging the glass plates at their bottom edges, which supports are adapted to be lowered, whereas the second section of the apparatus either does not contain a bottom edge-supporting conveyor or contains a bottom edge-supporting conveyor having supports which can be lowered. The mode of operation of such apparatus comprising two nozzles will also be described hereinafter so that said mode of operation need not be described further in this part of the description.

An assembling of insulating glass panes consisting of two glass plates in an operation in which an extrusion consisting of an initially pastelike and subsequently hardening composition is extruded into the space between the glass plates so that said composition when hardened will keep the glass plates spaced apart and will firmly join the glass plates and will seal the space between the glass plates against an ingress of moisture can be effected in a refined manner by an apparatus which is in accordance with the invention and provided with sealing dies. This will become apparent upon a comparison with the prior art apparent from DE 23 10 501 A1. That printed publication describes an apparatus in which a stationary nozzle is used to seal pairs of glass plates which are disposed on opposite sides of a spacer and are temporarily held together by clips or the like. When an extrusion has been discharged at one of the edges of the glass plates which have been clipped together, the pairs of glass plates held together by clips or the like must be rotated through 90° so that the next extrusion can be discharged along the adjoining edge. Before the last extrusion is discharged, the temporarily provided spacer and the clips must be removed. Such apparatus cannot be used for an efficient automated manufacture, which is possible with the apparatus in accordance with the invention.

Nozzles which can be used to discharge into the space between two glass plates a single-layer or two-layer extrusion have been disclosed in co-pending U.S.

patent applications Ser. Nos. 897,493, filed Aug. 15, 1986, for "AN APPARATUS FOR JOINING TWO PANES OF GLASS TO FORM A FUSED SPACED WINDOW PANE" and 925,882, filed Oct. 31, 1986, for "SPACER ON A DEVICE FOR CONNECTING TWO GLASS PLATES TO FORM AN EDGE-BONDED INSULATING-GLASS PANE". The contents of the foregoing patent applications are incorporated herein by reference.

In the assembling of insulating glass panes in an approximately vertical position one of the two glass plates will merely be suspended by the one or more vacuum-applying conveyors and will require a particularly reliable support until said one glass plate has been joined to the other glass plate, which is supported by an associated vacuum-applying conveyor also by leaning against the same. For this reason it is recommended to provide the apparatus in its first section, in which the glass plates have not yet been joined, on that side of the planes of travel on which the glass plates are merely suspended from a vacuum-applying conveyor, with two or more vacuum-applying conveyors which are spaced apart in height and define a common plane of travel and jointly retain the suspended glass plate of each pair. In said first section it will be sufficient to provide on the other side of the planes of travel a single vacuum-applying conveyor, which is opposite to the lowermost of the vacuum-applying conveyors disposed on the first-mentioned side of the planes of travel. Said one vacuum-applying conveyor on one side will suitably be supplemented by backing means which are disposed above said one vacuum-applying conveyor and may preferably consist of an air cushion wall for backing glass plates which substantially protrude in height beyond said one vacuum-applying conveyor. In the last section of the apparatus the insulating glass pane has been sealed along all four edges and the sealing composition can exert part of the force required to retain that glass plate which has merely been suspended as it was conveyed in the first section of the apparatus. For this reason a single vacuum-applying conveyor is sufficient to convey said glass plate in the last section of the apparatus and suitably contacts said glass plate near its bottom edge. On the other hand, at least for a conveyance of large glass plates the last section of the apparatus must be provided on the opposite side of the planes of travel with two or more vacuum-applying conveyors which are spaced apart in height and jointly act on the insulating glass pane and reliably retain and convey the same while it is not supported at its bottom edge by a bottom edge-supporting conveyor.

In order to position two plates so that they are coextensive and parallel to each other and transversely spaced apart and in register so that they can be conveyed in that arrangement by the apparatus in accordance with the invention, that apparatus may be preceded by an apparatus such as is described in DE 28 20 620 A1 and by which the spaced apart plates which are in register with each other are conveyed into the apparatus in accordance with the invention. Alternatively, two plates may be arranged in the apparatus in accordance with the invention so that said plates are transversely spaced apart and in register with each other. For that purpose one of the plates may be moved in one of the planes of travel defined by the apparatus until said one plate is arrested in a predetermined position, whereafter the vacuum-applying conveyor or conveyors on the opposite side is or are moved to contact said plate and operated to apply a vacuum to said one plate and to move said one plate transversely to the direction of travel in which the plate has entered the apparatus so that said one plate then extends in the second plane of travel, which is parallel to the first. The second plate can then enter the apparatus in the plane of travel in which the first plate entered the apparatus, and can be arrested in the position in which the first plate had been arrested. The two plates are now transversely spaced apart and in register and can then be conveyed in synchronism in that the vacuum-applying conveyors disposed on opposite sides of the planes of travel are synchronously driven.

BRIEF DESCRIPTION OF THE DRAWINGS

FIGS. 3a and 3b are a view which is taken in the same direction as FIG. 3 but illustrate on a larger scale as a detail how the initially leading glass plate of each pair is supported at its top and bottom edges, respectively, in the pairing station shown in FIG. 3.

FIG. 8a is a detail view relating to FIG. 8 and shows the arrangement of safety pins under the vacuum-applying conveyors.

DETAILED DESCRIPTION OF THE PREFERRED EMBODIMENTS

Figure 1:
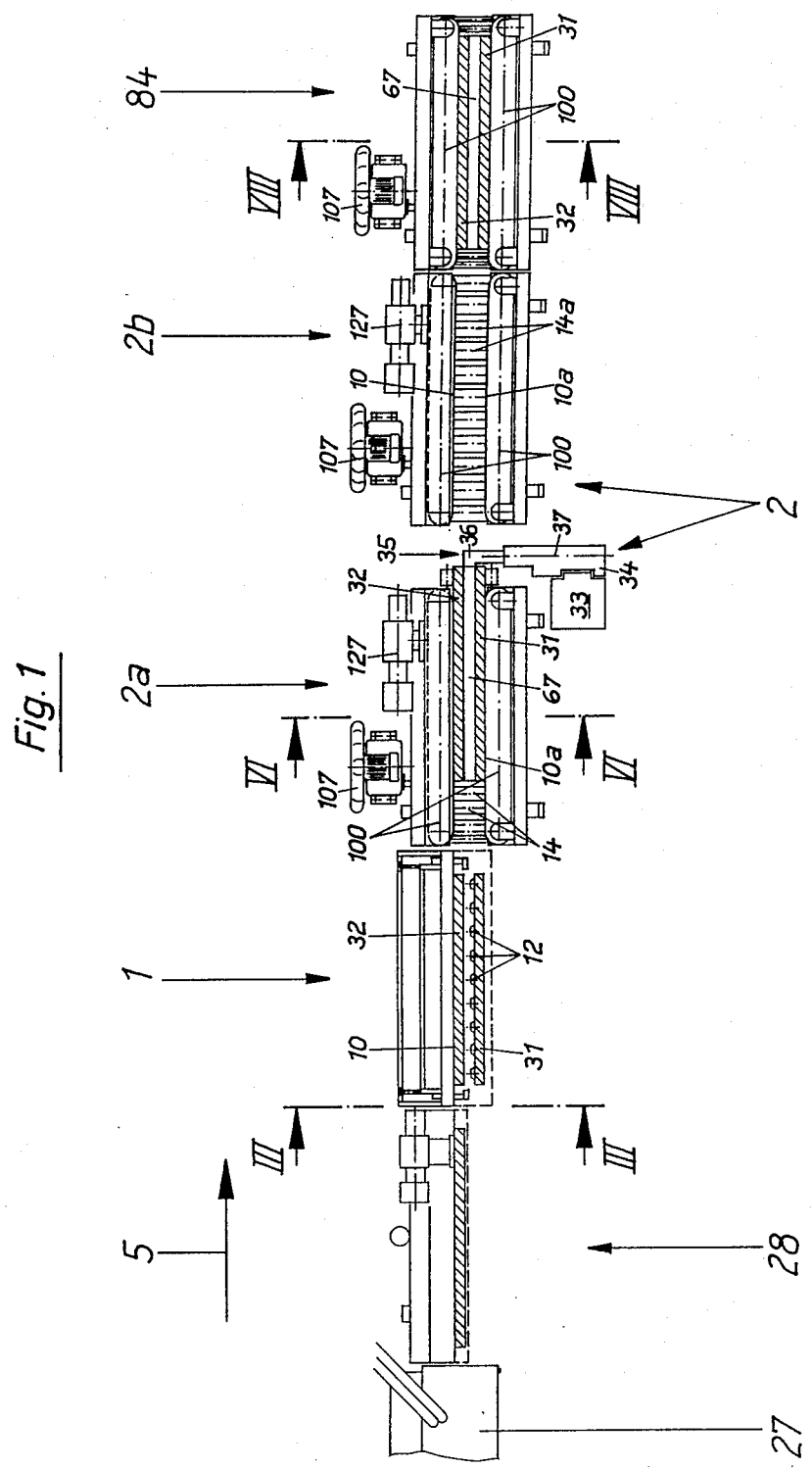
FIG. 1 is a top plan view showing an insulating glass assembly line, which comprises an apparatus which embodies the invention and in which two glass plates are joined to form an insulating glass pane in that a single nozzle is used to discharge between the two glass plates along their edges an extrusion consisting of an initially pastelike and subsequently hardening composition.
Figure 2:
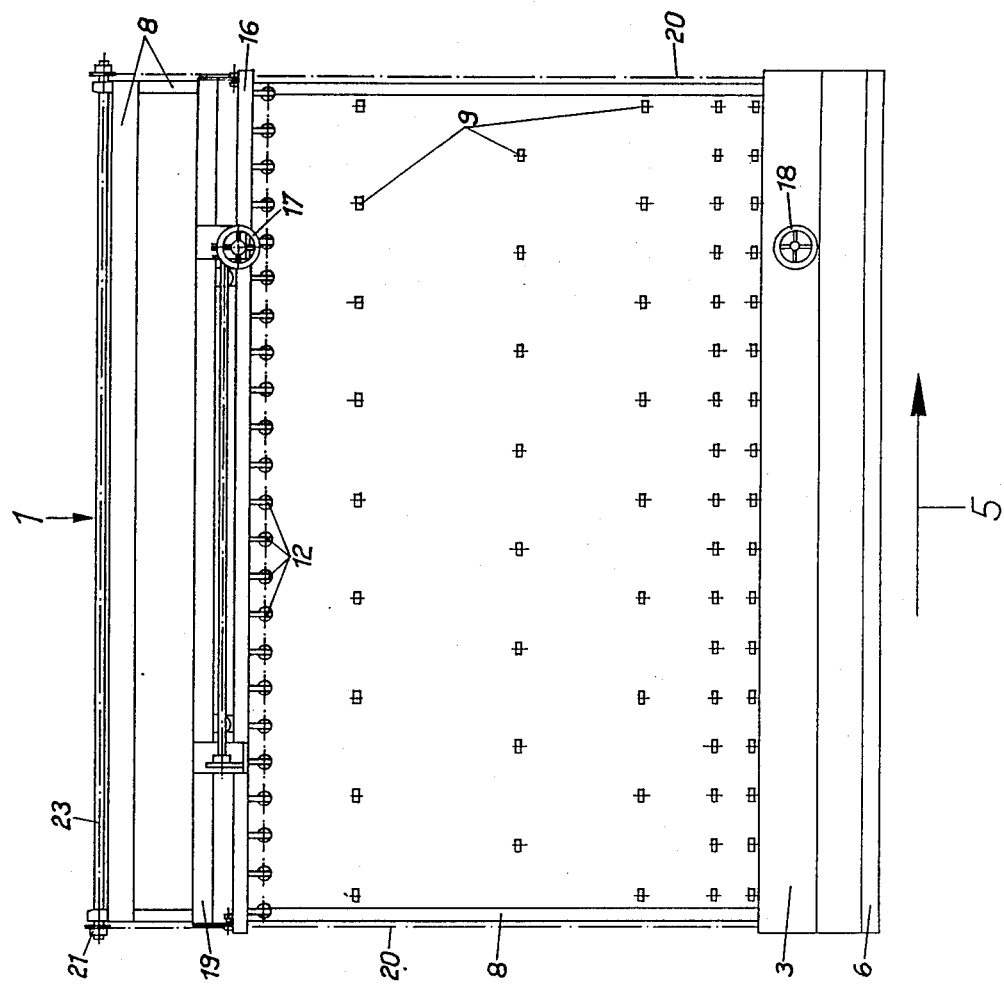
FIG. 2 is a front elevation showing the pairing station of said assembly line. That pairing station serves so to position two consecutive glass plates that they are transversely spaced apart and parallel to and in register with each other.

Two illustrative embodiments of the invention are diagrammatically shown on the accompanying drawings and will now be described.

In the assembly line shown in FIGS. 1 to 8, the following units are arranged one behind the other in a direction of travel indicated by an arrow 5: A washing machine 27, a transfer conveyor 28, a pairing station 1, a sealing station 2 consisting of two consecutive sections 2a and 2b, and a taking station 84.

Figure 3:
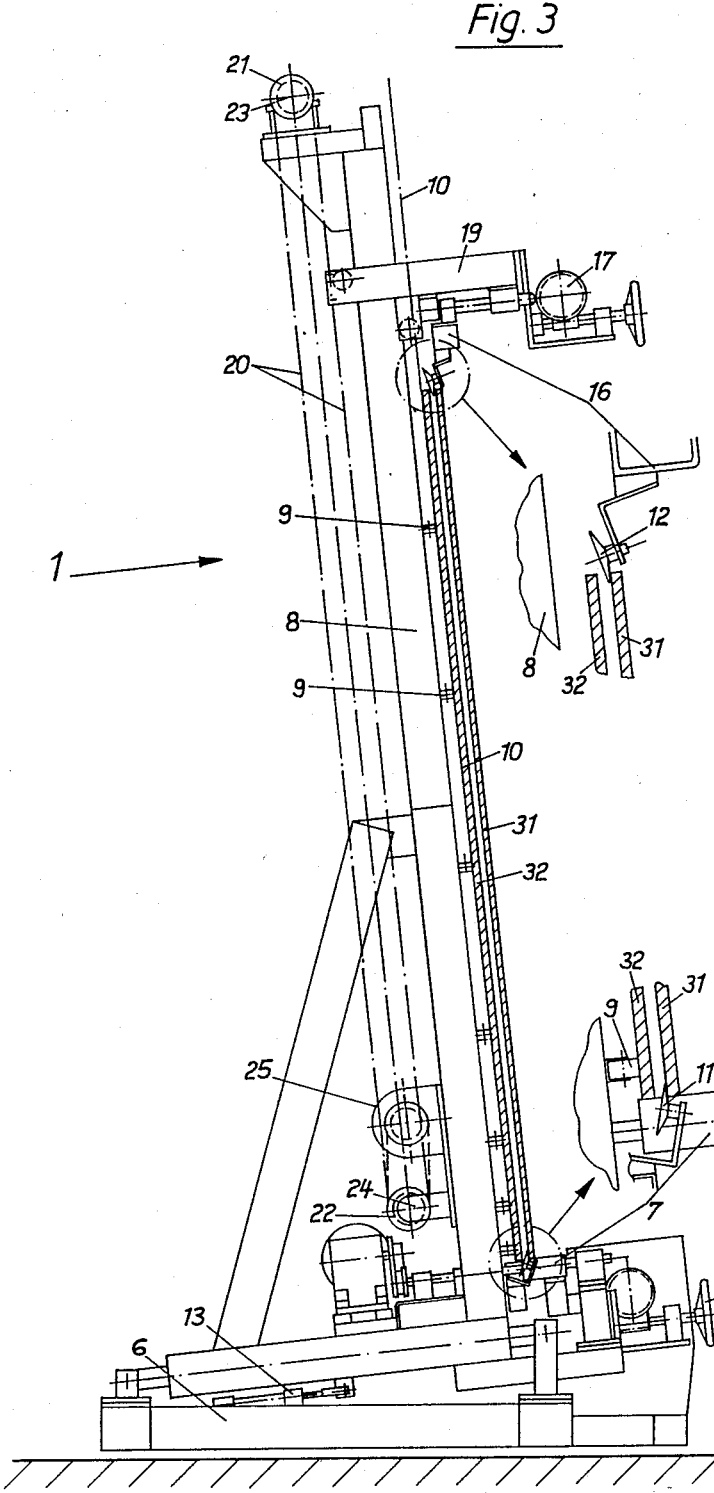
FIG. 3 is a side elevation showing the pairing station viewed in the direction of travel of the glass plates in the assembly line.
Figure 4:
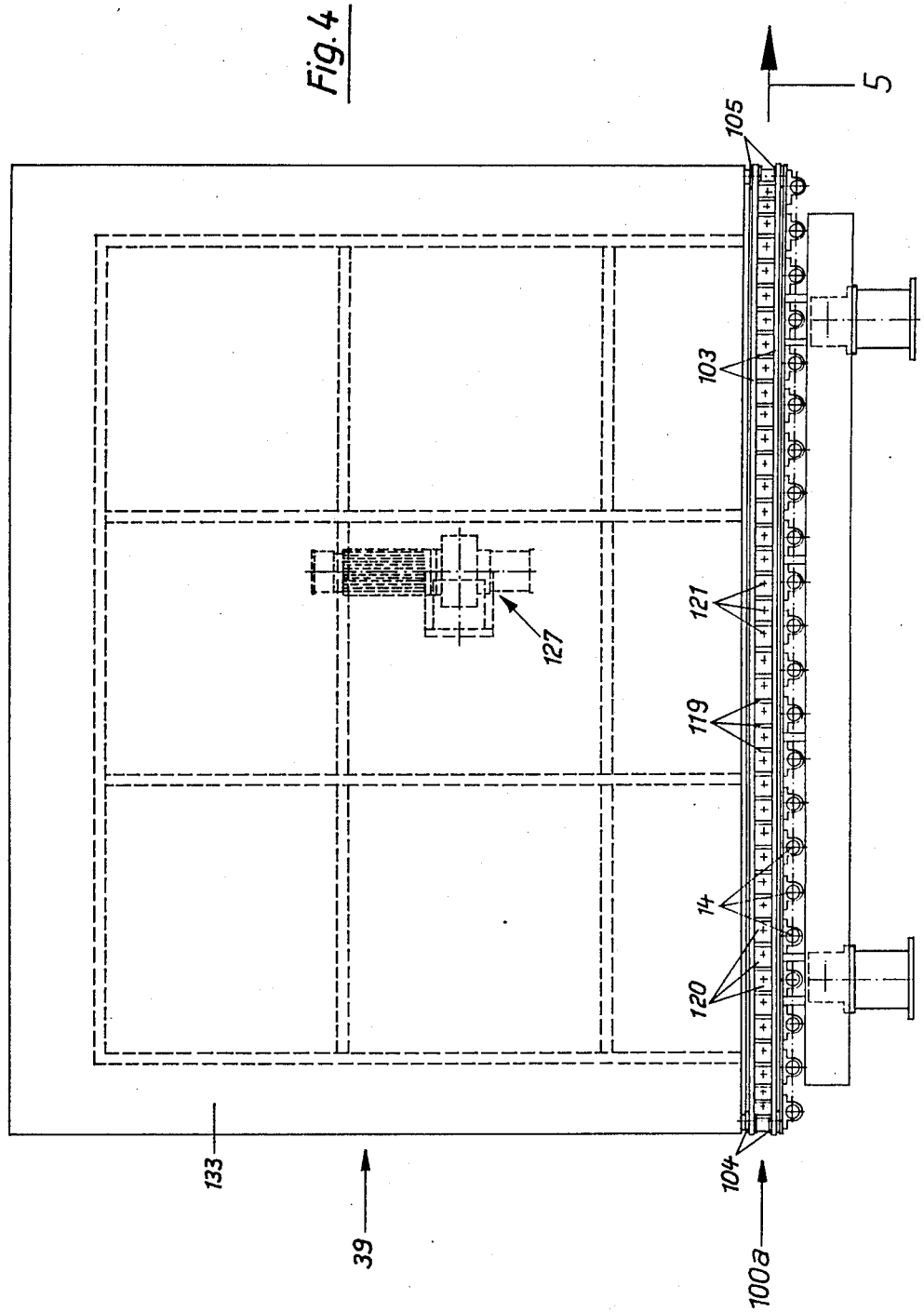
FIG. 4 is an elevation taken on line IV—IV in FIG. 6 and shows that sub-section of the first section of the conveying apparatus embodying the invention which is disposed behind the planes of travel.

Glass plates 31, 32 are conveyed in the direction of travel 5 by the transfer conveyor 28 from the washing machine 27 to the pairing station 1 and consecutively enter the latter and are paired in the pairing station 1 to form pairs of coextensive glass plates which are in register and transversely spaced a predetermined distance apart. For that purpose the pairing station 1 constitutes a horizontal conveyor, which is mounted on a main frame 6 and comprises a bottom edge-supporting conveyor, an array of freely rotatable backing rollers 9, which are disposed above the bottom edge-supporting conveyor and define a plane of travel for the glass plates, and conical backing rollers 11 and 12, which define a second plane that is parallel to the plane of travel 10 and are arranged in two rows, which are parallel to the bottom edge-supporting conveyor. The latter comprises a row of rollers 7 which are synchronously driven (FIG. 3). The backing rollers 9 are freely rotatably mounted in a frame 8, which is fixed to the mainframe 6 and is rearwardly and upwardly inclined from the vertical by a few degrees. The plane of travel 10 has the same inclination. The axes of the backing rollers 9 are approximately vertical and parallel to the plane of travel 10. The axes of the rollers 7 of the bottom edge-supporting conveyor are at right angles to the plane of travel 10.

The mainframe 6 together with the frame 8 is mounted to be displaceable by a piston-cylinder unit 13 at right angles to the plane of travel 10. The top edges of the lower backing rollers 11 slightly protrude above the plane of contact which is defined by the rollers 7 of the bottom edge-supporting conveyor. The upper backing rollers 12 are mounted on a horizontal beam 16, which is mounted on the frame 8 for a displacement in height. Adjusting means 17 and 18 are provided for adjusting the distance between the backing rollers of each row 11 or 12 and the plane of travel 10.

The beam 16 carrying the backing rollers 12 of the upper row and the associated adjusting means 17 are mounted on a crossbeam 19, which is guided by and movable along the two side posts of the frame 8. The crossbeam 19 can be moved up and down by means of two chains 20, which are connected to respective ends of the crossbeam 19. Each of said chains 20 extends from the crossbeam 19 upwardly to an upper sprocket 21 and is trained around the latter and then extends downwardly to a lower sprocket 22 and is trained around the latter and then extends upwardly to the crossbeam 19. The two upper sprockets 21 are non-rotatably connected by a shaft 23. The two lower sprockets 22 are non-rotatably connected by a shaft 24, which is driven by a motor 25.

The glass plates 31, 32 are delivered to the pairing station 1 in the direction of travel 5. The pairing station is preceded, e.g., by the washing machine 27 and the transfer conveyor 28, which is succeeded by the pairing station 1. The glass plates are upright as they travel through the washing machine 27 and then enter the transfer conveyor 28, which transfers them to the pairing station 1. It will be understood that the glass plates conveyed in the washing machine 27, on the transfer conveyor 28 and into the pairing station are contiguous to the same planes of travel 10 and the units 27, 28 and 1 have bottom edge-supporting conveyors which define planes of contact disposed on the same level.

Before the leading glass plate 31 of a pair enters the pairing station 1, the latter is moved by the piston-cylinder unit 13 to a position in which the plane defined by the backing rollers 11 and 12 coincides with the plane of travel 10 of the transfer conveyor 28. As a result, the first glass plate 31 stands on the rollers 7 and leans on the backing rollers 11 and 12 as it enters the pairing station 1 and is arrested therein in a predetermined position preferably in that the leading vertical edge of the glass plate 31 strikes against a retractable stop, which is not shown. The second glass plate 32, which is to register with the first glass plate 31, has entered the transfer conveyor 28 in the meantime. Before the second glass plate 32 enters the pairing station 1, the frame 8 of the latter is advanced by the piston-cylinder unit 13 to such an extent that the plane of travel defined by the backing rollers 9 coincides with the plane of travel 10 of the transfer conveyor 28. (The plane of travel 10 extends throughout all stations of the assembly line.) As a result, the glass plate 32 entering the pairing station 1 is backed by the backing rollers 9, which are mounted on the frame 8, and is conveyed in the direction of travel 5 between the backing rollers 9 and the first glass plate 31 until the glass plate 32 is in register with the first glass plate 31 (see FIG. 1) and is then arrested, preferably by the same stop.

In the pairing station 1 the second glass plate 32 could be conveyed by the same rollers 7 which support the first glass plate 31 because the latter has been arrested by the stop. But this would result in friction between the rollers 7 and the first glass plate 31 so that it may be desirable to convey the glass plates 31 and 32 by pairs of coaxial rollers, which may be coupled by a friction coupling, as is disclosed in Published German Application 28 20 630.

To permit the backing rollers 11 and 12 to enter even a small space between the two glass plates 31 and 32, the backing rollers 11 and 12 are conical and—as is shown in detail in FIGS. 3a and 3b—protrude only slightly into the space between the two glass plates 31 and 32 and on their conical peripheral surface support the first glass plate 31.

The assembly line may readily be used to assemble insulating glass panes which differ in size. If consecutive glass plates differ in height, their height may be detected by sensors, which may be disposed, e.g., adjacent to the transfer conveyor 28, and in dependence on the output signals of said sensors the backing rollers 12 may be adjusted to a suitable elevation before the leading glass plate 31 of a pair thereof enters the pairing station. The difference between the transfer conveyor 28 and the pairing station resides in that the former does not have the conical backing rollers 11 and 12 and their mountings and that the frame 8 of the transfer conveyor 28 is not transversely displaceable.

The pairing station 1 is succeeded by the sealing station 2, which comprises two sections 2a and 2b, which are arranged one behind the other in the direction of travel 5 (FIG. 1).

Figure 5:
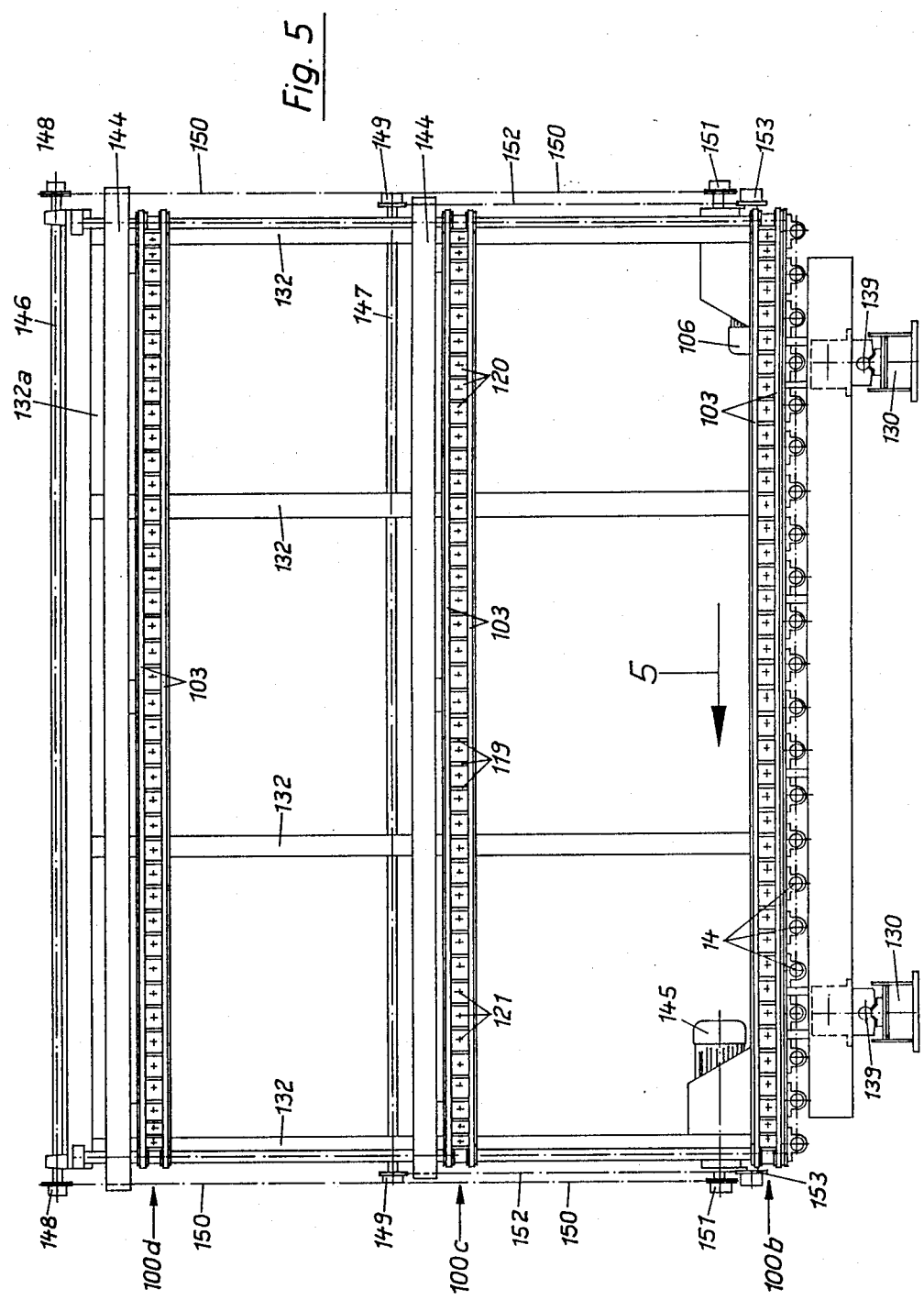
FIG. 5 is an elevation taken on line V—V in FIG. 6 and shows that sub-section of the first section of a conveying apparatus embodying the invention which is disposed in front of the planes of travel.
Figure 6:
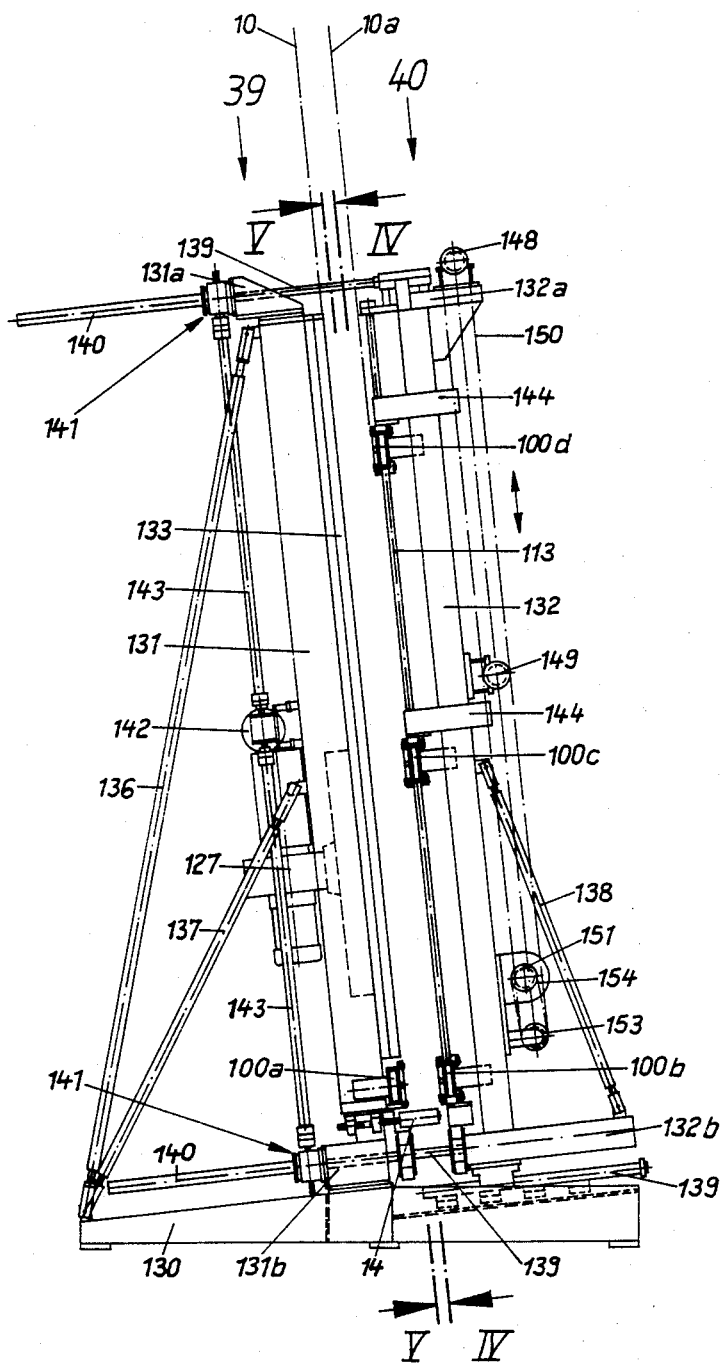
FIG. 6 is a transverse sectional view taken on line VI—VI in FIG. 1 and showing the first section of the conveying apparatus embodying the invention.

The first section 2a comprises a bottom edge-supporting conveyor, which comprises a horizontal row of rollers 14, which are adapted to be synchronously driven and are arranged on the same level as the rollers 7 of the pairing station 1. Vacuum-applying conveyors 100 are disposed above the rollers 14 on opposite sides of the section 2a. Only one vacuum-applying conveyor 100a, which is closely spaced above the rollers 14, is provided in that sub-section 39 of the section 2a of the sealing station which is shown in front elevation in FIG. 4 and is shown in FIG. 6 on the left of the plane of travel 10, which will sometimes be described hereinafter as the rear plane of travel. Three parallel vacuum-applying conveyors 100b, 100c, 100d, which are spaced one above the other and define a common tangential plane are provided in that sub-section 40 of the section 2a of the sealing station which is shown in FIG. 5 and is shown on the right in FIG. 6. The vacuum-applying conveyors 100b, 100c, 100d define a common tangential plane, which constitutes a second plane of travel 10a, which is parallel to the plane of travel 10 and will sometimes be described hereinafter as the forward plane of travel. The outer broadside of the glass plate 32 extends in the rear plane of travel 10. The outer broadside of the glass plate 31 extends in the forward plane of travel 10a.

The four vacuum-applying conveyors 100a to 100d have the same design, which will now be described.

Each vacuum-applying conveyor 100 comprises a carrier consisting of a channel member 101, which is closed at both ends and is connected at its web by tubular ports 102 to the suction side of a fan 107. The open side of the channel member 101 faces the adjacent plane of travel 10 or 10a and is covered by a plate 108, which is welded to the channel member 101 and extends throughout the length of the channel member and slightly protrudes from the channel member on both sides. Said protruding portions of the plate 108 disposed on both sides of the channel 101 are formed on the outside with two shallow grooves 109, in which respective endless belts 103 extend. Said belts are trained each about two belt pulleys 104 and 105 provided at respective ends of the channel member 101. The belt pulleys 104 and 105 are mounted on the channel member 101 or on brackets which are secured to the channel member. The pulleys 104 and 105 are so arranged that the working course of each belt extends parallel to the outside surface of the plate 108 and slightly protrudes—preferably between 0.5 mm 1 mm—beyond the outside surface of the plate 108. The outside surfaces of the working courses of the two belts jointly define the plane of travel 10 or 10a.

To permit the belts 103 to be tensioned independently of each other, the two belt pulleys 104 provided at one end of the channel member 101 are mounted on separate shafts rather than on a common shaft and said shafts are adjustable along the channel member. The belt pulleys 105 provided at the other end of the channel member 101 are not adjustable along the channel member 101 and are synchronously driven by a motor 106. For this purpose the belt pulleys 105 are secured to a common splined shaft 113.

A vacuum channel 115, which is open to the plane of travel 10 or 10a is provided on the open side of the channel member 101 and is specifically defined by the outside surface of the plate 108 and by side ribs, which extend along opposite longitudinal sides of the plate 108 and slightly protrude toward the plane of travel 10 or 10a by 5 mm to 10 mm. The working courses of the belts 103 slightly protrude beyond the side ribs by about 0.5 mm to 0.8 mm. The vacuum channel 115 is thus defined on its longitudinal sides by the side ribs and is divided in length by crossribs 119, which extend transversely to the direction of travel 5 and have an outside surface which is coplanar with the outside surfaces of the side ribs. A suction port 121 extends through the plate 108 at the center of each chamber 120 which is defined by the crossribs 119 and the side ribs and connects said chamber 120 to the interior 122 of the channel member 101, from which air is sucked through the tubular ports 102. As a result, the interior 122 of the channel member constitutes a vacuum source for the chambers 120 disposed on the forward side of the plate 108 so that said chambers can be described as vacuum chamber and in their entirety constitute the vacuum channel 115 of the apparatus embodying the invention.

A glass plate 32 or 31 being conveyed along its plane of travel 10 or 10a is in contact with the working courses of the two belts and is sucked by the vacuum which is quickly established between the glass plate 31 or 32 and the plate 108 so that the glass plate 31 or 32 can be conveyed without a slip. The vacuum chambers 120 are preferably so dimensioned that a plurality of said chambers are covered by each glass plate 31 or 32. Conveyors which are suitable for a conveyance of glass plates are suitably provided with vacuum chambers which are defined by crossribs 119 which have a length of 15 cm to 20 cm and in the intermediate portion of the length of the vacuum conveyor are spaced 15 cm to 20 cm apart whereas their spacing at each end of the channel member 101 is only 5 cm to 10 cm so that the glass plates will be conveyed without a slip even at the ends of the vacuum-applying conveyor.

Owing to the provision of the crossribs 119 the required and desired vacuum will be maintained at least in those vacuum chambers 120 which are disposed in the intermediate portion of the length of the channel member 101 and are covered by a glass plate 31 or 32. The longitudinally extending side ribs define only slight clearances with the adjacent glass plate 31 or 32 so that the flow of air from the longitudinal sides into the vacuum chambers 120 covered by a glass plate is highly restricted.

The working course of each belt may bear on its rear side on the bottom of the associated groove 109, as has been described in the prior mentioned co-pending U.S. patent application Ser. No. 768,020, filed Aug. 21, 1985. But the friction of the belts can be reduced if the working course bears on its rear side on a series of closely spaced apart rollers, as is disclosed in the co-pending U.S. patent application Ser. No. 925,615, filed Oct. 31, 1986. The contents of that co-pending U.S. patent application is incorporated herein by reference.

The rear sub-section 39 and the forward sub-section 40 of the first section 2a of the sealing station are mounted on a common frame 130. The rear sub-section 39 comprises a rectangular frame 131 having a lower horizontal bar, in which the rollers 14 are mounted. One vacuum-applying conveyor 100a is mounted in the frame 131 closely above the rollers 14. An air cushion wall 133 is mounted on the frame 131 above the vacuum-applying conveyor and consists of a plane wall which is provided with air exit openings 134, which are distributed over the forward surface of the wall 133 and communicate with a shallow cavity 135, which is formed in the wall 133. Air is blown by the fan 127 into that cavity 135 and exits through the air exit openings 134. The forward surface of the air cushion wall 133 is flush with the rear plane of travel 10 or is only slightly spaced behind the same. The frame 131 with the air cushion wall 133 and the vacuum-applying conveyor 100a is upwardly and rearwardly inclined from the vertical by a few degrees and is supported on the frame 130 by means of struts 136 and 137.

The opposite sub-section 40 of the section 2a of the sealing station also comprises a rectangular frame 132, which has the same small inclination from the vertical as the frame 131 and is supported by struts 138. To change the spacing of the frame 132 from the frame 131, the frame 132 is mounted on guide rods 139, which belong to the frame 130 and on which the frame 132 can be displaced parallel to itself. This can be effected by means of screws, which are secured to the upper bar 132a and the lower 132b of the frame 132 and extend transversely to the planes of travel 10 and 10a into sleeves 140, which are mounted on the rear of the upper bar 131a and the lower bar 131b of the frame 131. The screws 139 extend through nuts 141, which are rotatably mounted on the frame 131 and adapted to be driven in synchronism by a motor 142, to which they are mechanically connected by transmitting elements including two drive shafts 143 shown in FIG. 6.

Figure 7:
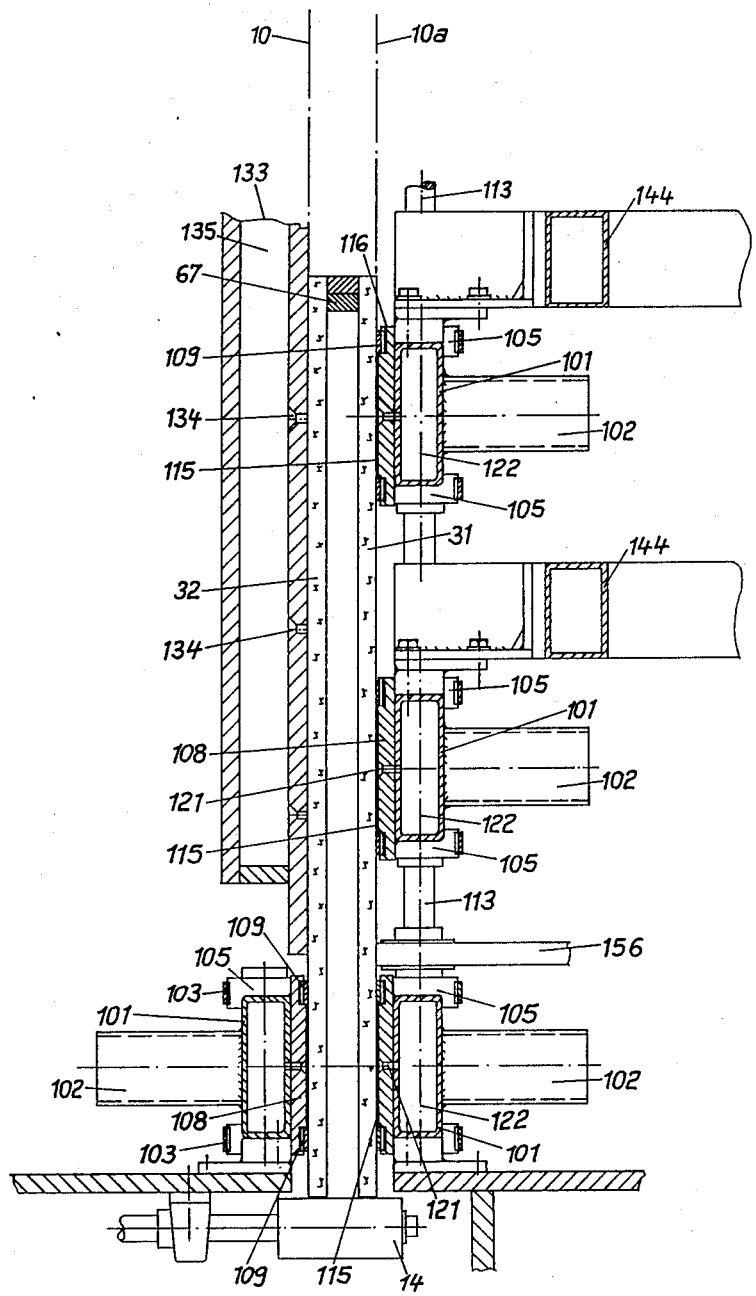
FIG. 7 is an enlarged transverse sectional view taken on a line corresponding to line VI—VI in FIG. 1 but illustrates a detail of a modification comprising vacuum-applying conveyors which are closely spaced apart one above the other.
Figure 8:
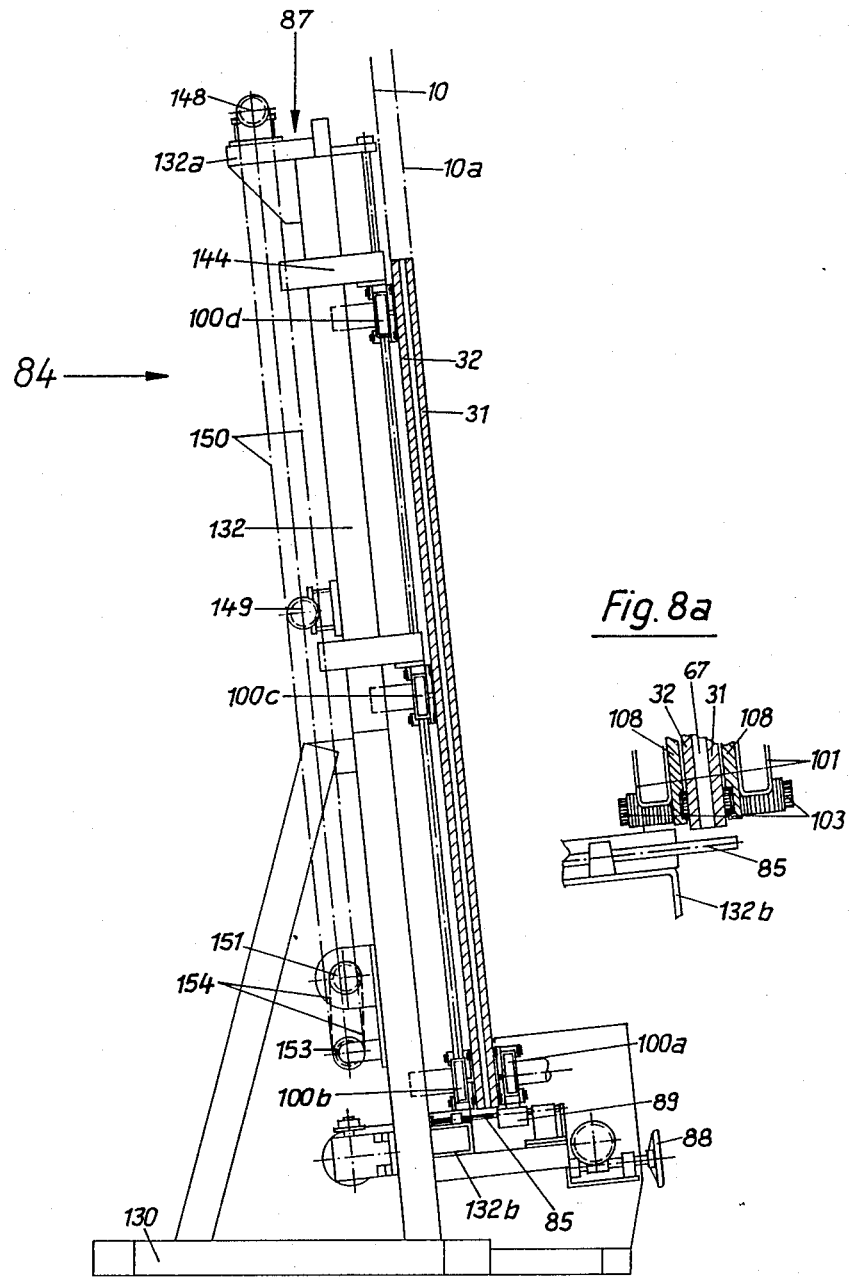
FIG. 8 is a transverse sectional view taken on line VIII—VIII in FIG. 1 and shows the last section of a conveying apparatus embodying the invention.

As is apparent from FIGS. 5 to 7 the spacing of the three vacuum-applying conveyors 100b, 100c and 100d which are mounted in the frame 132 is adjustable. The elevation of the lower vacuum-applying conveyor 100b is fixed and is so selected that the conveyor 100b is always directly opposite to the vacuum-applying conveyor 100a mounted in the frame 131. The two upper vacuum-applying conveyors 100c and 100d are secured to horizontal beams 144, which extend parallel to the plane of travel 10a and are mounted on end bars of the frame 132 for an adjustment in height. For that purpose a first shaft 146 is mounted on the upper bar 132a of the frame 132 and a second shaft 147 is mounted slightly above the center of the height of the frame 132. Sprockets 148 and 149 are mounted on the ends of said shafts. Endless chains 150 are trained around the upper sprockets 148 and around coaxial sprockets 151, which are mounted in the lower portion of the frame 132 and one of which is directly driven by the motor 145. Two endless chains 152 are trained around the intermediate sprockets 149 and around coaxial sprockets 153, which are provided in the lower portion of the frame 132 and one of which is driven by an intermediate chain 154 from the motor 145. The transmission ratios are so selected that during an adjustment of the vacuum-applying conveyors in height the displacement of the upper vacuum-applying conveyor 100d will always be twice the displacement of the intermediate vacuum-applying conveyor 100c so that the intermediate vacuum-applying conveyor 100c will always be disposed midway between the upper vacuum-applying conveyor 100d and the lower vacuum-applying conveyor 100b. FIG. 5 shows the vacuum-applying conveyors in the position in which they are spaced the largest distance apart. In FIG. 7 they are shown in the position in which they are spaced the samllest distance apart.

To permit the belts 103 of the three vacuum-applying conveyors 100b, 100c, 100d to be driven in synchronism, their driven belt pulleys 105 are secured to a common, continuous splined shaft 113, which in the embodiment shown is driven by the motor 106 via a V-belt 156.

The second section 2b of the sealing station is similar to the first section 2a and identical or corresponding components are designated with identical reference numerals. The only difference between the first and second sections 2a and 2b resides in that the rollers 14a of the bottom edge-supporting conveyor of the second section 2b are adapted to be lowered.

The taking station 84 is similar to the first section 2a of the sealing station and identical or corresponding components are designated with the same reference numerals. The difference between the taking station 84 and the first section 2a of the sealing station resides in that the taking station 84 has no bottom edge-supporting conveyor and the lower frame bar 132b is provided with pins 85 rather than with rollers 14. The pins 85 extend at right angles to the plane of travel 10 and their apices are slightly below the plane of contact which is defined for the glass plates 31 and 32 by the rollers 14 and 14a in the sealing station. As a result, the glass plates 31, 32 being conveyed in the taking station are clear of the pins 85, which serve only to intercept the glass plates 31, 32 if they fall from the vacuum-applying conveyors 100 in case of a malfunction.

Another difference between the taking station 84 and the first section 2a of the sealing station resides in that the three vacuum-applying conveyors 100b, 100c, 100d, which are arranged one above the other with an adjustable spacing in the forward sub-section 40 of the section 2a of the sealing station are omitted and three similar conveyors 100b, 100c, 100d are provided in the rear section 87 of the taking station 84. In their arrangement and their adjustability the three vacuum-applying conveyors 100b, 100c and 100d of the taking station 84 correspond to those of the sections 2a and 2b of the sealing station. But in the taking station 84 the frame 132 in which the three vacuum-applying conveyors 100b, 100c and 100d are mounted is not displaceable parallel to itself in the direction of travel. The taking station 84 comprises a vacuum-applying conveyor 100a, which is directly opposite to the lower vacuum-applying conveyor 100b, and an adjusting device 88 is provided, which is operable manually, as shown, or by a motor to displace the vacuum-applying conveyor 100a parallel to itself transversely to the plane of travel 10 on a horizontal beam 89 which is secured to the mainframe. In this manner the spacing of the two vacuum-applying conveyors 100a and 100b can be adjusted. The taking station 84 differs from the sealing station 2a, 2b in that it does not comprise an air cushion wall above the vacuum-applying conveyor 100a but the insulating glass pane consisting of the glass plates 31, 32 is freely accessible in the taking station 84 except for that surface portion which is covered by the vacuum-applying conveyor 100a along the bottom edge of the glass plate 31.

A mechanism for driving, guiding and operating a nozzle 36 is provided at the delivery end of the first section 2a of the sealing station. The nozzle 36 is mounted on a carriage 34 and is movable up and down with said carriage along a path 35 in a space between the two sections 2a and 2b of the sealing station. The path 35 is at right angles to the direction of travel 5 and parallel to the planes of travel 10 and 10a. The nozzle 36 is mounted on the carriage 34 for a rotation in steps of 90° about an axis 37 which is at right angles to the planes of travel 10 and 10a.

The mode of operation of the assembly line shown in FIGS. 1 to 8 will now be described further. The sequence of operations by which two glass plates 31 and 32 are moved to a position in which they are transversely spaced apart and in register with each other in the pairing station has been described hereinbefore on pages 24 to 25. The following description starts from the position in which the two glass plates 31 and 32 which are to be assembled to form an insulating glass pane are transverely spaced apart and in register with the pairing station 1, as is apparent from FIG. 1 showing the pairing station in a top plan view. From that position in the pairing station 1 the two plates 31 and 32 are jointly conveyed through the section 2a of the sealing station into the section 2b of the sealing station and in said two sections 2a and 2b both plates 31 and 32 stand on the rollers 14 and 14b of the two bottom edge-supporting conveyors. At that time, the rear glass plate 32 bears on the belt 103 of the rear vacuum-applying conveyor 100a and above that vacuum-applying conveyor bears on the air cushion wall 133. On the other hand, the forward glass plate 31 being conveyed from the pairing station into the sealing station is contiguous to the forward plane of travel 10a and contacts the three vacuum-applying conveyors 100b, 100c and 100d, which suck the glass plate 31 near its bottom edge, approximately at the center of its height, and near its top edge. Owing to the vacuum established between each of the glass plates 31 and 32 and the associated vacuum channel 115 the glass plates adhere to the belts 103, which are transversely spaced an adjustable distance apart and are driven in synchronism so that the two glass plates are synchronously conveyed without a slip. Glass plates 31 and 32 which differ in height from those conveyed before may be detected before the glass plates enter the pairing station by sensors provided, e.g., adjacent to the transfer conveyor 28. The elevation of the upper backing rollers 12 in the pairing station 1 and of the upper vacuum-applying conveyors 100c and 100d in the sealing station and in the taking station 84 may be correspondingly adjusted in dependence on the output signals of such sensors.

When a pair of glass plates 31, 32 have left the pairing station 1 the latter can be moved transversely to the direction of travel 5 to its initial position so that the leading glass plate 31 of the next pair thereof can be moved into the pairing station 1 from the transfer conveyor 28 while said glass plate 31 leans against the backing rollers 11 and 12.

In the sealing station the glass plates 31 and 32 are conveyed to a predetermined position, in which they are arrested. In that position their trailing up and down edge is disposed in the space between the two sections 2a and 2b of the sealing station. In that space the path 35 for the single nozzle 36 is disposed. When the glass plates 31 and 32 have been arrested in that position, the nozzle drive 33 is actuated to move the nozzle 36 to the trailing lower corner of the glass plates 31 and 32 and into the space between the glass plates and then to move the nozzle 36 upwardly along the trailing edge of the glass plates 31 and 32 as far as to the trailing upper corner. During the last-mentioned upward movement the nozzle 36 discharges between the two glass plates 31 and 32 an extrusion consisting of an initially pastelike composition. The upward movement of the nozzle 36 is arrested when it has reached the trailing upper corner and the nozzle is then rotated through 90° in a clockwise sense when viewed from below in FIG. 1. The command to stop the nozzle drive may be delivered by a sensor which leads the nozzle 36 by a predetermined distance and is responsive to the position of the glass plates 31, 32. Alternatively, the nozzle may be controlled by a displacement encoder in dependence on previously taken measurements of the size of the glass plates. When the nozzle 36 has completed its pivotal movement—this may be indicated by a limit switch—the pair of glass plates 31, 32 are reversely moved opposite to the direction of travel 5 to enter the first section 2a of the sealing station and are arrested there in a position in which that edge of the glass plates which is the leading edge in the direction of travel 5 is disposed in the space between the two sections 2a and 2b of the sealing station. The glass plates are shown in that position in FIG. 1. During that reverse movement of the two glass plates 31 and 32 the nozzle 36 is held in position and discharges an extrusion 67 of the pastelike composition into the space between the glass plates along their top edge. The position of the nozzle 36 and the reverse movement of the glass plates 31 and 32 are so matched that—as indicated in FIG. 1—the rollers 14 and the vacuum-applying converyors 100 are stopped to arrest the glass plates when the nozzle 36 has reached the upper corner of that edge of the pair of glass plates which is the leading edge in the direction of travel 5. While the pair of glass plates 31, 32 are held in that position, the nozzle 36 is once more rotated through 90° in the clockwise sense when viewed from below in FIG. 1 and the nozzle is subsequently moved downwardly along the leading edge of the pair of glass plates, as is shown in FIG. 1, until the nozzle has reached the leading lower corner of the pair of glass plates. During that movement the nozzle 36 also discharges the initially pastelike composition into the space between the glass plates 31, 32.

While the pair of glass plates 31, 32 are still held in position the nozzle 36 is once more rotated through 90° in the clockwise sense when viewed from below in FIG. 1 so that the nozzle now faces the bottom edge of the pair of glass plates. At the same time, the rollers 14a of the bottom edge-supporting conveyor in the second section 2b of the sealing station are lowered to some extent. The pair of glass plates 31, 32 are then conveyed in the direction of travel 5 and the pastelike composition is discharged into the space between the glass plates 31, 32 along their bottom edge while said glass plates 31, 32 re-enter the second section 2b of the sealing station and are taken over there by the four vacuum-applying conveyors 100a to 100d but are no longer supported by the rollers 14a so that the glass plates 31, 32 are entirely exposed at all four edges. The glass plates 31, 32 may be conveyed continuously throughout their length into the second section 2b of the sealing station because the sealing operation has been completed when the nozzle 36 has reached the trailing lower corner and the nozzle is then automatically closed. Thereafter the nozzle is rotated once more through 90° in the clockwise sense when viewed from below in FIG. 1 and is then ready to seal the next pair of glass plates, which have moved into the first section 2a of the sealing station in the meantime.

From the second section 2b of the sealing station the insulating glass pane consisting of the glass plates 31 and 32 is continuously forwarded into the taking station 84 and is stopped there in the position which is shown in FIG. 1. The next following pair of glass plates can enter the second section 2b of the sealing station at the same time and the sealing of said next following pair may be initiated, beginning at their trailing edge. In the meantime, the completed insulating glass pane can be lifted out of the taking station 84 and be carried to a storage facility. The insulating glass pane can be lifted out of the taking station 84 by means of a vaccuum-applying lifting implement, which is applied to the forward surface of the glass plate 31. As soon as the vacuum-applying lifting implement has taken over the insulating glass pane, the vaccuum-applying conveyors 100a to 100d in the taking station 84 may be shut off from their vacuum source, e.g., in that the fan 107 is de-energized or in that a separate air admission valve is opened, so that the vacuum-applying conveyors 100a to 100d release the completed insulating glass pane. The lifting of the insulating glass pane can be facilitated in that the forward vacuum-applying conveyor 100a is moved away from the rear vacuum-applying conveyors 100b to 100d. A vacuum-applying lifting implement which can be used to take off the completed insulating glass panes has been disclosed in the German Utility Model G 85 26 920, which is based on a prior application.

Figure 9:
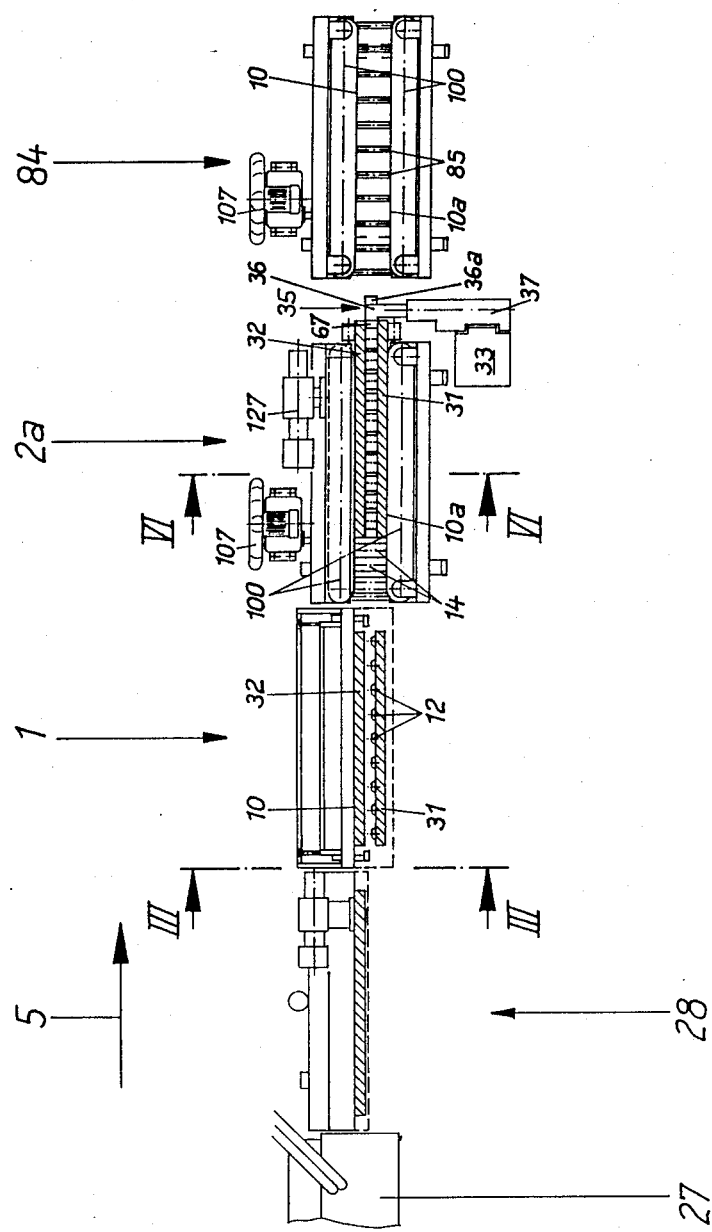
FIG. 9 is a top plan view showing an insulating glass assembly line which comprises apparatus embodying the invention and used to assemble an insulating glass pane from two glass plates in that two nozzles are used to discharge into the space between the two glass plates along the edges thereof an extrusion consisting of an initially pastelike and subsequently hardening composition.

FIG. 9 shows an assembly line which is used to make insulating glass and comprises two nozzles. That assembly line is substantially similar to the assembly line described hereinbefore, which has only one nozzle, and identical or corresponding parts are designated with the same reference numerals and their description will not be repeated in detail. The two illustrated assembly lines comprising one nozzle and two nozzles, respectively, agree entirely as regards the washing machine 27, the transfer conveyor 28, the pairing station 1 and the first section 2a of the sealing station. In the assembly line comprising two nozzles the sealing station does not have a second section 2b such as is provided in the assembly line having only one nozzle but the sealing station entirely designated 2a is immediately succeeded by the taking station 84, which is the same as in the assembly line having only one nozzle.

In the second assembly line, one of the two nozzles is designated 36 and designed, arranged and movable like the single nozzle 36 of the first assembly line. But in the assembly line comprising two nozzles said nozzles 36 serves only to seal the insulating glass panes along their leading, top and trailing edges. Another nozzle 36a is provided to seal the insulating glass pane at its bottom edge and is capable only of a limited up and down displacement in a direction that is parallel to the plane of travel 10. The second nozzle 36a is movable up and down between a position of rest below the plane of contact defined by the rollers 14 of the bottom edge-supporting conveyor to an operating position, in which the nozzle 36a protrudes above the plane of contact defined by the rollers 14 to the extent to which the nozzle 36a is to protrude into the space between the glass plates 31, 32. Because the second nozzle 36a is disposed below the first nozzle 36, the former is substantially covered by the upper nozzle 36 in the top plan view shown in FIG. 9.

The insulating glass pane is assembled as follows. Just as in the first assembly line the two glass plates 31 and 32 are positioned to be transversely spaced apart and to register with each other so that the description of that positioning operation need not be repeated. The glass plates 31 and 32 which are transversely spaced apart and register with each other are jointly transferred from the pairing station 1 to the succeeding sealing station 2a and are supported there by the rollers 14 and moved to a predetermined end position, in which the leading edge of the two glass plates 31 and 32 slightly protrudes beyond the sealing station 2a into the space between the sealing station 2a and the taking station 84, as is shown in FIG. 9. At that time the rear glass plate bears on the rear vacuum-applying conveyor 100a and may bear also on the air cushion wall 133 disposed above the vacuum-applying conveyor 100a. The forward glass plate 31 bears on the forward vacuum-applying conveyors 100b, 100c and 100d. Owing to the force exerted by the vacuum-applying conveyors 100, the two glass plates 31 and 32 are conveyed without a slip and are held a preselectable, constant distance apart.

When the glass plates are in the position shown in FIG. 9, the upper nozzle 36 is introduced into the space between the glass plates at their leading lower corner and is then moved along the path 35 and during that movement discharges an extrusion 67 of pastelike material along the leading edge of the pair of glass plates. At the same time, the frame 8 is retracted in the pairing station 1 so that the leading glass plate of the next pair thereof can enter the pairing station 1 while said leading glass plate leans against the backing rollers 11 and 12. During the same time, the lower nozzle 36a is raised from its position of rest to enter adjacent to the leading lower corner of the pair of glass plates 31, 32 the space between said plates.

As soon as the lower nozzle 36 has reached the upper corner of the pair of glass plates 31, 32, the nozzle 36 is arrested and is then rotated through 90° in a counterclockwise sense when viewed from below in FIG. 9. During the rotation of the nozzle 36 the discharge of the pastelike composition from the nozzle 36 is desirably interrupted in order to prevent an overfilling of the edge portion adjacent to the corner. When the upper nozzle 36 has completed its rotation, the vacuum-action conveyors 100 and the rollers 14 in the sealing station 2a are operated to resume the conveyance of the pair of glass plates 31, 32 in the direction of travel 5 so that the pair of glass plates 31, 32 are transferred to the succeeding taking station 84, in which the two glass plates 31 and 32 are taken over by the vacuum-applying conveyors 100a to 100d of the taking station and are held and conveyed only by the last-mentioned vacuum-applying conveyors. The taking station 84 is not provided with supporting rollers 14 such as are used in the sealing station 2a but instead of said supporting rollers 14 is provided with pins 85, which are spaced below the bottom edge of the glass plates 31 and 32. As the glass plates are conveyed from the sealing station 2a into the taking station 84, the two nozzles 36 and 36a are operated at the same time to discharge pastelike material into the space between the glass plates 31, 32 along the top and bottom edges thereof. When the two nozzles 36 and 36a have reached the respective trailing corners of the pair of glass plates 31, 32, the drive for the vacuum-applying conveyors 100a to 100d in the taking station 84 is stopped to arrest the pair of glass plates. At the same time, the supply of the pastelike composition to the two nozzles 36, 36a is interrupted. The upper nozzle 36 is rotated once more through 90° in the counterclockwise sense when viewed from below in FIG. 9 and is then moved down along the trailing edge of the glass plates 31, 32 so that the latter are sealed at their trailing edge. At the same time, the lower nozzle 36a is returned to its position of rest below the plane of contact of the rollers 14. During the same time the pair of glass plates which are to be sealed next can enter the sealing station 2a.

As soon as the upper nozzle 36 has reached the trailing lower corner of the pair of glass plates 31, 32, the upper nozzle is arrested and the supply of the paste-like composition is interrupted. The insulating glass pane has now been completed and can be conveyed out of the taking station 84 by its vacuum-applying conveyors 100a to 100d or may be taken from said vacuum-applying conveyors in the manner which has been described in connection with the first assembly line and may then be carried to a storage facility. The upper nozzle 36 is then rotated through 180° and adjacent to the leading upper corner is introduced into the space between the two following glass plates. Nozzles which can be used in the two above-described assembly lines for discharging a single-layer or a double-layer extrusion into the space between two glass plates have been described in the two German patent applications referred to on page 17 of this description.

In both assembly lines the pairing station 1 may be omitted and the glass plates may be paired in the first section 2a of the sealing station of the first embodiment and in the sealing station 2a of the second embodiment. This may be accomplished in that the leading glass plate 31 of a pair of glass plates is permitted to enter the section or sealing station 2a at the plane of travel 10 while said glass plate leans against the rear vacuum-applying conveyor 100a and the air cushion wall 133 and is contiguous to the plane of travel 10, and the glass plate 31 is then taken over by the vacuum-applying conveyors 100b, 100c and 100d in that the latter are displaced transversely to the direction of travel 5 until they contact the glass plate 31 and are then caused to suck the same, whereafter the vacuum-applying conveyors 100b to 100d are transversely moved away from the vacuum-applying conveyor 100a and the backing wall 133 until the glass plate 31 is contiguous to the plane of travel 10a. The second glass plate 32 can then enter the section or sealing station 2a while said second glass plate 32 leans against the rear vacuum-applying conveyor 100a and the air cushion wall 133 and is spaced the desired distance from the glass plate 31 and may be arrested when the glass plates register with each other. No sealing can obviously be effected during that positioning of the glass plates in the section or sealing station 2a so that the cycle time of the assembly line will be correspondingly prolonged.

The sealing station and the taking station used in the two illustrated assembly lines may also be used to seal insulating glass panes which have previously been assembled in that a spacer frame coated on both sides is interposed between the two glass plates. For instance, insulating glass panes which have been assembled but have not yet been sealed may be transferred into the first section 2a of the sealing station or into the sealing station 2a by a transfer conveyor, which may be similar to the transfer conveyor 28 of FIG. 1, and the sealing in the first section 2a of the sealing station or in the sealing station 2a can be performed in the manner which has been described hereinbefore with reference to the two assembly lines. Nozzles which may be used to seal such insulating glass panes have been described in DE-32 17 410 C2.

In the embodiment shown in FIGS. 1 to 8, the apparatus for edge-sealing the glass plates 31 and 32 comprises three sections, namely, the sections 2a and 2b of the sealing station 2 and the taking station 84. In the embodiment shown in FIG. 9, the apparatus for edge-sealing the glass plates 31 and 32 comprises two sections, namely, the sealing station 2a and the taking station 84.

I claim:

1. In apparatus for edge-sealing two coextensive glass plates, which are transversely spaced apart and in register and have bottom edges and broadsides which are remote from each other and extend in respective, approximately vertical, parallel planes of travel, comprising conveying means which are adapted to contact said plates on said broadsides in said planes of travel and operable to sliplessly convey said plates in a horizontal direction of travel which is parallel to said planes of travel, the improvement residing in that said apparatus comprises first and second sections, which are arranged one behind the other and spaced apart in said direction of travel, said conveying means comprise in each of said sections on each side of the apparatus at least one vacuum-applying conveyor, which is operable to apply a vacuum to and to contact said broadside of one of said plates in the adjacent plane of travel and to sliplessly convey said one plate in said direction of travel, said conveying means further comprise drive means for synchronously driving said vacuum-applying conveyors, a nozzle is provided, which has a discharge opening that is disposed between said two sections and between said planes of travel, said nozzle is movable in a direction which is transverse to said direction of travel and parallel to said planes of travel and operable to discharge through said discharge opening an initially pastelike and subsequently hardening composition between said two glass plates, a second nozzle is provided, which has a discharge opening that is disposed between said two sections and between said planes of travel, said second nozzle is operable to discharge through said discharge opening an initially pastelike and subsequently hardening composition between said two glass plates at said bottom edges, said first section comprises a bottom edge-supporting conveyor, which comprises supporting means for supporting said plates at said bottom edges when said plates are in contact with said vacuum-applying conveyors, additional drive means are provided for driving said bottom edge-supporting conveyors in synchronism with and in the same sense as said vacuum-applying conveyors, said second section is free of such bottom edge-supporting conveyor.

2. The improvement set forth in claim 1, wherein said second section comprises such bottom edge-supporting conveyor in which said supporting means are adapted to be lowered to clear said bottom edges of said plates in contact with said vacuum-applying conveyors.

3. The improvement set forth in claim 1, wherein said second section comprises on one side of the apparatus a plurality of said vacuum-applying conveyors, which are juxtaposed and spaced apart transversely to said direction of travel and define a common plane of travel, which plurality of vacuum-applying conveyors comprise a lowermost vacuum-applying conveyor, and said second section comprises on the other side of the apparatus only one of said vacuum-applying conveyors, which is opposite to said lowermost vacuum-applying conveyor, and non-vacuum backing means disposed above said one vacuum-applying conveyor and adapted to contact said broadside of one of said plates in the associated plane of travel.

4. In apparatus for edge-sealing two coextensive glass plates, which are tranversely spaced apart and in register and have bottom edges and broadsides which are remote from each other and extend in respective, approximately vertical, parallel planes of travel, comprising conveying means which are adapted to contact said plates on said broadsides in said planes of travel and operable to sliplessly convey said plates in a horizontal direction of travel which is parallel to said planes of travel, the improvement residing in that said apparatus comprises first and second sections, which are arranged one behind the other and spaced apart in said direction of travel, said conveying means comprise in each of said sections on each side of the apparatus at least one vacuum-applying conveyor, which is operable to apply a vacuum to and to contact said broadside of one of said plates in the adjacent plane of travel and to sliplessly convey said one plate in said direction of travel, said conveying means further comprise drive means for synchronously driving said vacuum-applying conveyors, a nozzle is provided, which has a discharge opening that is disposed between said two sections and between said planes of travel, said nozzle is movable in a direction which is transverse to said direction of travel and parallel to said planes of travel and operable to discharge through said discharge opening an initially pastelike and subsequently hardening composition between said two glass plates, said second section is succeeded in said direction of travel by a third section, which comprises on each side of the apparatus at least one vacuum-applying conveyor, which is operable to apply a vacuum to and to contact said broadside of one of said plates in the adjacent plane of travel and to sliplessly convey said one plate in said directon of travel, and said third section is free of such bottom edge-supporting conveyor.

5. In apparatus for edge-sealing two coextensive glass plates, which are transversely spaced apart and in register and have bottom edges and broadsides which are remote from each other and extend in respective, approximately vertical, parallel planes of travel, comprising conveying means which are adapted to contact said plates on said broadsides in said planes of travel and operable to sliplessly convey said plates in a horizontal direction of travel which is parallel to said planes of travel, the improvement residing in that said apparatus comprises first and second sections, which are arranged one behind the other and spaced apart in said direction of travel, said conveying means comprise in each of said sections on each side of the apparatus at least one vacuum-applying conveyor, which is operable to apply a vacuum to and to contact said broadside of one of said plates in the adjacent plane of travel and to sliplessly convey said one plate in said direction of travel, said conveying means further comprise drive means for synchronously driving said vacuum-applying conveyors, a nozzle is provided, which has a discharge opening that is disposed between said two sections and between said planes of travel, said nozzle is movable in a direction which is transverse to said direction of travel and parallel to said planes of travel and operable to discharge through said discharge opening an initially pastelike and subsequently hardening composition between said two glass plates, said second section is succeeded in said direction of travel by a third section, which comprises on each side of the apparatus at least one vacuum-applying conveyor, which is operable to apply a vacuum to and to contact said broadside of one of said plates in the adjacent plane of travel and to sliplessly convey said one plate in said direction of travel, each of said first, second and third sections comprises a bottom edge-supporting conveyor, which comprises supporting means for supporting said plates at said bottom edges when said plates are in contact with said vacuum-applying conveyors, additional drive means are provided for driving said bottom edge-supporting conveyors in synchronism with and in the same sense as said vacuum-applying conveyors in said second and third sections are adapted to be lowered to clear said bottom edges of said plates when they are in contact with said vacuum-applying conveyors.

6. In apparatus for edge-sealing two coextensive glass plates, which are transversely spaced apart and in register and have bottom edges and broadsides which are remote from each other and extend in respective, approximately vertical, parallel planes of travel, comprising conveying means which are adapted to contact said plates on said broadsides in said planes of travel and operable to sliplessly convey said plates in a horizontal direction of travel which is parallel to said planes of travel, the improvement residing in that said apparatus comprises first and second sections, which are arranged one behind the other and spaced apart in said direction of travel, said conveying means comprise in each of said sections on each side of the apparatus at least one vacuum-applying conveyor, which is operable to apply a vacuum to and to contact said broadside of one of said plates in the adjacent plane of travel and to sliplessly convey said one plate in said direction of travel, said conveying means further comprise drive means for synchronously driving said vacuum-applying conveyors, a nozzle is provided, which has a discharge opening that is disposed between said two sections and between said planes of travel, said nozzle is movable in a direction which is transverse to said direction of travel and parallel to said planes of travel and operable to discharge through said discharge opening an initially pastelike and subsequently hardening composition between said two glass plates, said first section comprises on one side of the apparatus a plurality of said vacuum-applying conveyors, which are juxtaposed and spaced apart transversely to said direction of travel and define a common plane of travel, and said first section comprises on the other side of the apparatus only one of said vacuum-applying conveyors and non-vacuum backing means disposed above said one vacuum-applying conveyor and adapted to contact said broadside of one of said plates in the associated plane of travel.

7. The improvement set forth in claim 6, wherein said first section comprises on said one side of the apparatus only one of said vacuum-applying conveyors and non-vacuum backing means disposed above said one vacuum-applying conveyor and adapted to contact said broadside of one of said plates in the associated plane of travel.

8. In apparatus for edge-sealing two coextensive glass plates, which are transversely spaced apart and in register and have bottom edges and broadsides which are remote from each other and extend in respective, approximately vertical, parallel planes of travel, comprising conveying means which are adapted to contact said plates on said broadsides in said planes of travel and operable to sliplessly convey said plates in a horizontal direction of travel which is parallel to said planes of travel, the improvement residing in that said apparatus comprises first and second sections, which are arranged one behind the other and spaced apart in said direction of travel, said conveying means comprise in each of said sections on each side of the apparatus at least one vacuum-applying conveyor, which is operable to apply a vacuum to and to contact said broadside of one of said plates in the adjacent plane of travel and to sliplessly convey said one plate in said direction of travel, said conveying means further comprise drive means for synchronously driving said vacuum-applying conveyors, a nozzle is provided, which has a discharge opening that is disposed between said two sections and between said planes of travel, said nozzle is movable in a direction which is transverse to said direction of travel and parallel to said planes of travel and operable to discharge through said discharge opening an initially pastelike and subsequently hardening composition between said two glass plates, said second section is succeeded in said direction of travel by a third section, which comprises on each side of the apparatus at least one vacuum-applying conveyor, which is operable to apply a vacuum to and to contact said broadside of one of said plates in the adjacent plane of travel and to sliplessly convey said one plate in said direction of travel, said third section comprises on one side of the apparatus a plurality of said vacuum-applying conveyors, which are juxtaposed and spaced apart transversely to said direction of travel and define a common plane of travel, which plurality of vacuum-applying conveyors comprise a lowermost vacuum-applying conveyor, and said third section comprises on the other side of the apparatus only one of said vacuum-applying conveyors, which is opposite to said lowermost vacuum-applying conveyor, and non-vacuum backing means disposed above said one vacuum-applying conveyor and adapted to contact said broadside of one of said plates in the associated plane of travel.

9. In apparatus for edge-sealing two coextensive glass plates, which are transversely spaced apart and in register and have bottom edges and broadsides which are remote from each other and extend in respective, approximately vertical, parallel planes of travel, comprising conveying means which are adapted to contact said plates on said broadsides in said planes of travel and operable to sliplessly convey said plates in a horizontal direction of travel which is parallel to said planes of travel, the improvement residing in that said apparatus comprises first and second sections, which are arranged one behind the other and spaced apart in said direction of travel, said conveying means comprise in each of said sections on each side of the apparatus at least one vacuum-applying conveyor, which is operable to apply a vacuum to and to contact said broadside of one of said plates in the adjacent plane of travel and to sliplessly convey said one plate in said direction of travel, said conveying means further comprise drive means for synchronously driving said vacuum-applying conveyors, a nozzle is provided, which has a discharge opening that is disposed between said two sections and between said planes of travel, said nozzle is movable in a direction which is transverse to said direction of travel and parallel to said planes of travel and operable to discharge through said discharge opening an initially pastelike and subsequently hardening composition between said two glass plates, said vacuum-applying conveyors in said first and second sections are similarly arranged.

10. The improvement set forth in claim 9, wherein said second section is free of such bottom edge-supporting conveyor.

11. The improvement set forth in claim 9, wherein said second section comprises such bottom edge-supporting conveyor in which said supporting means are adapted to be lowered to clear said bottom edges of said plates in contact with said vacuum-applying conveyors.

12. The improvement set forth in claim 9, wherein said second section comprises on one side of the apparatus a plurality of said vacuum-applying conveyors, which are juxtaposed and spaced apart transversely to said direction of travel and define a common plane of travel, which plurality of vacuum-applying conveyors comprise a lowermost vacuum-applying conveyor, and said second section comprises on the other side of the apparatus only one of said vacuum-applying conveyors, which is opposite to said lowermost vacuum-applying conveyor, and non-vacuum backing means disposed above said one vacuum-applying conveyor and adapted to contact said broadside of one of said plates in the associated plane of travel.

13. The improvement set forth in claim 12, wherein said first section comprises on said other side of the apparatus only one of said vacuum-applying conveyors and non-vacuum backing means disposed above said one vacuum-applying conveyor and adapted to contact said broadside of one of said plates in the associated plane of travel.

* * * * *